April 30, 1968   HARRY GANTEAUME T.   3,380,538
MEANS AND METHOD FOR FORMING SEEDLING BEDS
Filed Oct. 16, 1964   4 Sheets-Sheet 1

INVENTOR.
HARRY GANTEAUME T.
BY
Davis, Hoxie, Faithfull & Hapgood
ATTORNEYS.

United States Patent Office 3,380,538
Patented Apr. 30, 1968

3,380,538
MEANS AND METHOD FOR FORMING
SEEDLING BEDS
Harry Ganteaume T., HDA "San Pablo," Turmero,
Edo. Aragua, Venezuela
Filed Oct. 16, 1964, Ser. No. 404,464
6 Claims. (Cl. 172—701)

ABSTRACT OF THE DISCLOSURE

A plow to provide subterranean compressed plant seedling beds, having two spaced digging tools suspended below a platform and superstructure rising above the platform. The plow is operated through the ground at a fixed level with the digging tools and at least a portion of the platform below the unplowed ground level. Forwardly and downwardly angled leading edges of the digging tools assist in providing said operation below ground level. A channel converging toward the rear of the plow is defined, as the plow operates, by the under surface of the platform and the inner surfaces of the digging tools. Furrows are formed by the digging tools, and a compressed seedling bed is formed between the furrows and below the original unplowed ground level from the soil passing through the convergent channel.

The present invention relates to the contouring of soil, and more particularly to the forming of soil to provide subterranean compressed plant seedling beds.

Present day means and methods of shaping soil preceding the planting of seedling crops, such as tobacco, tomatoes, and potatoes, generally contour the soil in the form of alternating ridges and furrows of the same height, with the ridges rising above the original unplowed ground surface comprising loose soil dug and thrown up as the furrows extending below the original unplowed ground surface are formed. The seedlings are planted approximately half-way between the bottoms of the furrows and the tops of the ridges, and the furrows may then be irrigated up to the level of the seedlings.

This type is planting has several distinct disadvantages. The seedlings may not be planted at the bottoms of the furrows, but rather must be planted on the slanting ridge sides at or above the original unplowed ground level in order that irrigation or rain water in the furrows will not submerge and destroy the seedlings. The seedlings are therefore somewhat unprotected and quite subject to the wind drying out the surrounding loose soil. The positioning of the seedlings at or above the original unplowed ground level means that the seedling roots will not extend very deeply into the subsoil below ground level, and said roots will quickly lose their surrounding moisture. Extensive and regular irrigation is usually needed, particularly in arid climates. Also, since the natural elements of the soil become more abundant several inches below the ground level, the seedlings by virtue of their positioning will not efficiently utilize these deeper-lying nutrient elements. Furthermore, since the seedlings are positioned on a slanting ridge surface, fertilizer added to the surrounding soil surface is easily washed and blown away during wind and rain storms. And, since the seedlings are positioned at the original unplowed soil surface, they are situated at the prime weed germinating soil layer. These weeds abundantly grow above and below the seedlings on the slanting ridge surfaces, and are of course difficult to remove.

It is the primary object of the present invention to provide a method and means of shaping and contouring plant seedling beds in a manner to overcome the above disadvantages and deficiencies of conventional seedling bed agriculture.

This object is accomplished in the present invention by establishing plant seedling beds which are not only below the level of the tops of the adjacent ridges but which are in fact below the original unplowed ground surface. Compressed subterranean ridges are formed as the plant seedling beds, each of which is situated between larger ridges on each side which are spaced from the subterranean ridge by irrigation furrows. The protective ridges on each side of a plant seedling bed rise above the original unplowed ground surface, and the plant seedlings, being planted below the original unplowed ground surface, are well protected from the wind and its drying effects. The seedlings have their roots at a soil depth where moisture is more readily retained and where plant nutrients are more abundant, and the seedlings are also situated away from the ground surface prime weed germinating region. The seedlings are planted on the top surfaces of the subterranean ridges so that their roots will absorb moisture from both sides of said ridges and will more readily retain fertilizer about them. The compression of the soil comprising the subterranean seedling beds serves to retain moisture for a considerably longer length of time about the seedling roots than would be the case if the seedling beds were formed in uncompressed or loose soil. A primary result of the present invention is therefore to drastically reduce the amount of irrigation needed in conventional seedling agriculture described above. A further result is that less fertilizer is required than used in conventional seedling agriculture.

The actual forming of the plant seedling beds is carried out by a plow having two digging tools spaced from each other and suspended from the lower surface of a platform having walls upwardly extending from the platform edges and converging in the direction of travel of the plow. The digging tools have a configuration such that when the plow is operated through a field, the digging tools are forced into the soil to dig deeply and to pull the platform and a portion of the platform superstructure into the soil subsurface. The weight of the plow also contributes to this digging action, and the plow then digs through the ground at a fixed level with the digging tools, the platform and a portion of the platform superstructure below the original unplowed soil surface. The operating digging tools form the furrows described above, with the outer surfaces of the digging tools guiding some of the soil from the furrows upwardly to contribute to the ridges above the original unplowed ground surface as described above. The remainder of the soil from the furrows formed by the digging tools is funneled into a soil restraining channel converging toward the rear and defined by the inner surfaces of the digging tools and the lower surface of the platform superstructure. The restraining channel is constructed so that the front open side of the channel through which soil enters is larger in area than an area toward the rear of the channel through which soil passes, and the plow operating at a uniform fixed level with the ground surface therefore compresses soil entering the channel to form the compressed subterranean ridge which comprises the plant seedling bed. The shape of the subterranean ridge is defined by the shape of said restraining channel, and the fact that the plow platform operates below the original unplowed ground surface results in said ridge terminating below the original ground surface. The seedlings are then planted in a small furrow which is formed on the top of the subterranean ridge by a channeling instrument positioned on the lower surface of the platform.

Other objects and the full nature of the present invention will be readily understood and appreciated from the following description, taken in conjunction with the following drawings, wherein.

Figure 1:
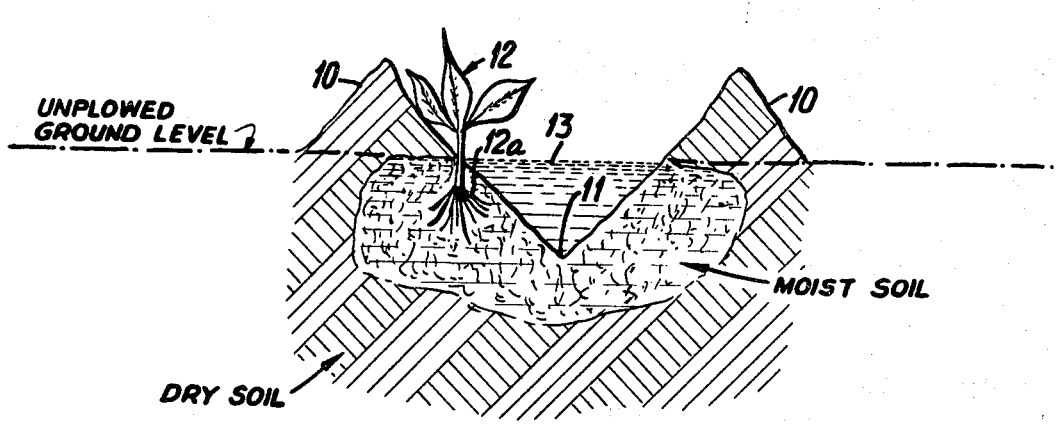
FIGURE 1 is a cross-sectional view of a seedling bed formed according to the conventional method of seedling planting, with the bed shown in an irrigated condition.
Figure 2:
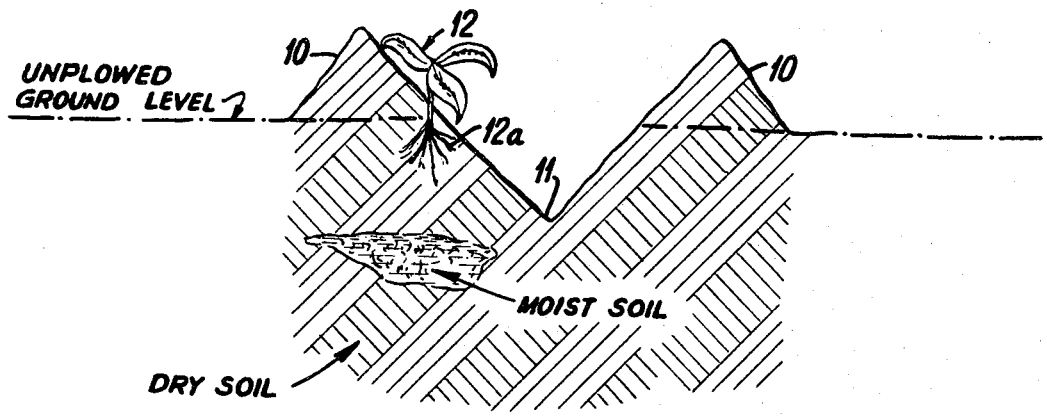
FIGURE 2 is a cross-sectional view of a seedling bed formed according to the conventional method of seedling planting, with the bed shown shortly after irrigation.

Referring to the cross-sectional views of FIGURES 1 and 2, a seedling 12 is shown planted according to the conventional method of seedling agriculture described above. Ridges 10 are approximately the same height above the ground level as furrow 11 is below the ground level, and are formed by loose soil dug up when furrow 11 (and adjacent furrows) is formed. The seedling 12 is shown planted on a slanting surface at the original unplowed ground level, and is therefore subject to the problems and disadvantages referred to above. Specifically, the soil surrounding the seedling 12 is quite subject to wind drying and weed germination. Seedling 12 may not be planted further down furrow 11, since it would then be submerged and destroyed by the irrigation necessary to grow the plants. Also, since the seedling 12 is situated on a slanting surface, it is difficult to retain fertilizer in the soil surrounding the plant during wind and rain storms. And since the roots 12a of the seedling 12 do not extend very deeply into the subsoil, they do not reach the deeper lying nutrients which would be beneficial to the seedling. FIGURES 1 and 2 show in particular detail the water problem associated with this method of planting. In FIGURE 1, furrow 11 is being irrigated by a body of water 13 up to the planting level of the seedling 12. This water has soaked into the soil surrounding the furrow 11 to create a large region of moist soil shown in FIGURE 1. FIGURE 2 shows the same ridges 10, furrow 11 and seedling 12 a short time after irrigation, with the only remaining region of moist soil being situated below and away from the shallow lying roots 12a. All of the loose soil adjoining furrow 11 has dried out, and the underlying moisture is of no benefit to seedling 12. This type of conventional seedling agriculture shown in FIGURES 1 and 2 require frequent and extensive irrigation to adequately grow seedling plants.

Figure 3:
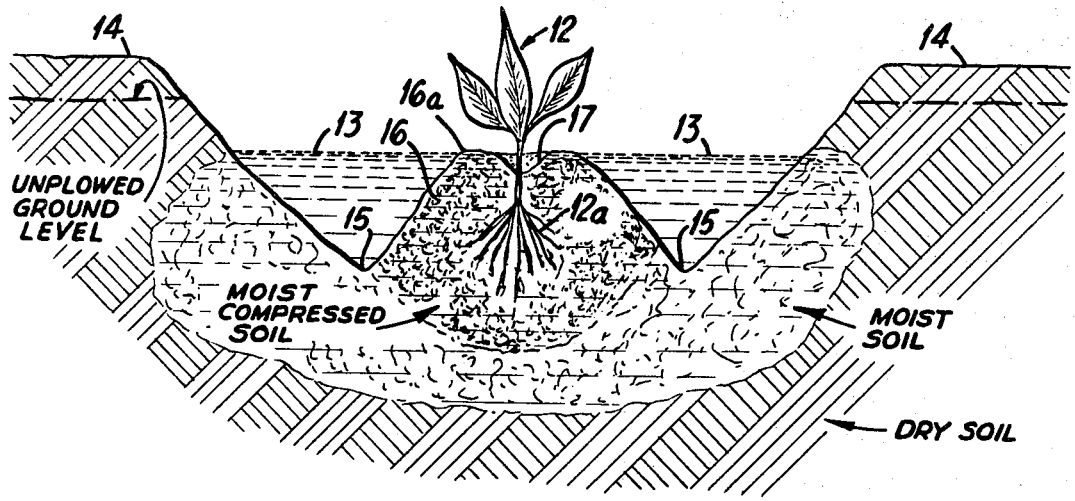
FIGURE 3 is a cross-sectional view of a seedling bed formed according to the method of planting of the present invention, with the bed shown in an irrigated condition.
Figure 4:
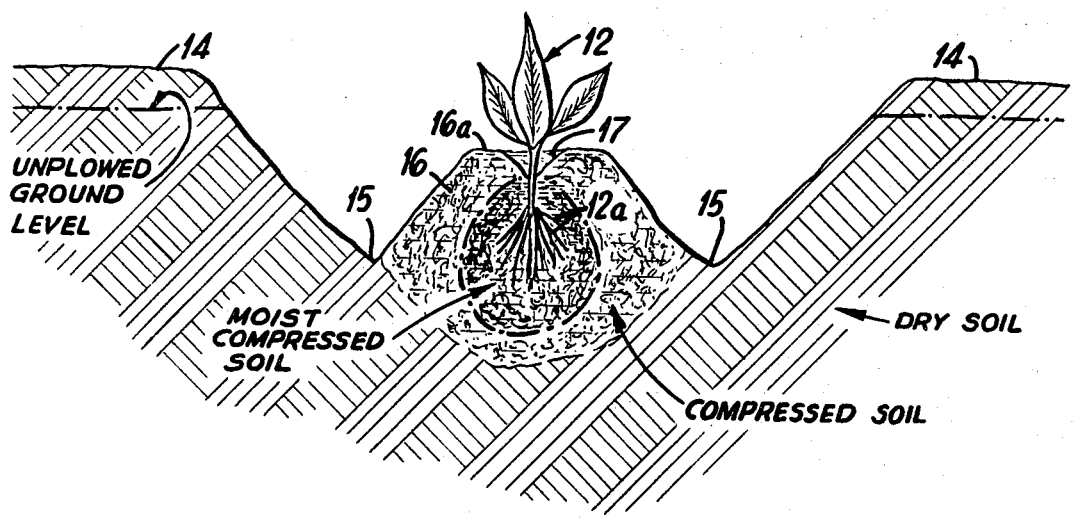
FIGURE 4 is a cross-sectional view of a seedling bed formed according to the method of planting of the present invention, with the bed shown at the same period of time after irrigation as in FIGURE 2.
Figure 5:
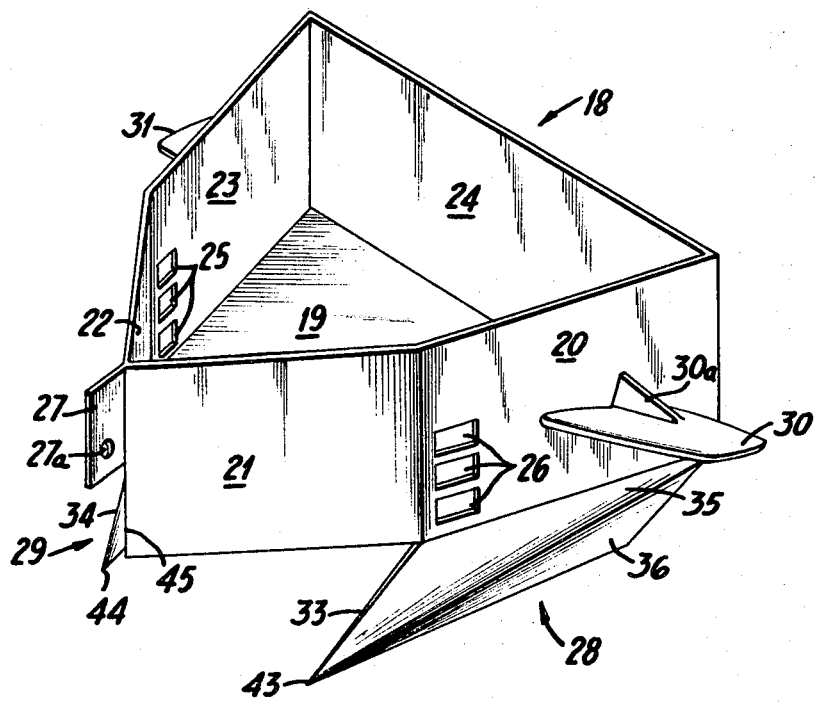
FIGURE 5 is a perspective view of plowing means constructed according to the present invention.

Referring to the cross-sectional views of FIGURES 3 and 4, illustrating the method of planting according to the present invention, seedling 12 is shown planted in a small furrow 17 on the flat top surface 16a of ridge 16. Ridge 16, forming the plant seedling bed, lies between two larger ridges 14 and is separated therefrom by furrows 15. In a field such as used for the growing of tobacco, there will of course be many parallel ridges 16 several feet apart from each other. Ridges 14 are shown to rise above the original unplowed ground level, whereas ridge 16 and its top surface 16a are situated below said level. Seedling 12 is therefore planted below this original ground level. Subterranean ridge 16 may be situated any desired distance below the original ground level, and will generally be several inches below said original level in the case of tobacco planting. The top surface 16a of ridge 16 will of course lie a sufficient distance above the bottom of furrows 15 to permit irrigation without submerging and destroying the seedling 12. Ridges 14 are formed in part by a portion of the soil from each adjacent furrow 15, said soil being guided upwardly and smoothly distributed on top of the original ground level. Part of the soil comprising ridges 14 is also derived from the soil originally lying between the original ground level and top surface 16a of ridge 16, said soil being cut away and channeled over to also contribute to ridges 14. The remaining soil from furrows 15 is compressed into the sides of ridge 16 during its forming process, so that ridge 16 is in fact quite compressed in relation to the density of the soil adjacent to ridge 16. This method of planting seedlings has several distinct advantages arising from the fact that the seedling is planted below the original ground level in a subterranean compressed seedling bed. First of all, seedling roots 12a reach deep enough into the soil to find the nutrients they need and are situated away from the prime weed germinating region of the original soil surface. The seedling 12 may also be planted on the flat top surface 16a of ridge 16, since the seedling 12 will still be sheltered from the wind and its effects, and fertilizer is more easily retained by said flat surface. Planting on the top of ridges 10 of FIGURES 1 and 2 would obviously not provide such shelter. Additionally, roots 12a of seedling 12 can absorb irrigation water from both sides of seedling bed 16, whereas in the method of planting of FIGURES 1 and 2, the roots 12a of seedling 12 are less effectively positioned in that they primarily absorb irrigation water only from the side of ridge 10 that the seedling 12 is planted on. And, since seedling bed 16 is compressed, it retains water much longer than does loose and uncompressed soil. FIGURES 3 and 4 show in particular detail how irrigation water is retained by the plant seedling bed 16. In FIGURE 3, the furrows 15 are being irrigated by bodies of water 13 up to the top surface level 16a of ridge 16. Ridge 16 has become moist throughout, and the soil adjacent furrows 15 and below ridge 16 is also moist. FIGURE 4 is a view of FIGURE 3 at the same period of time that FIGURE 2 is represented after FIGURE 1, and shows a moist region in compressed subterranean seedling bed 16 which still encompasses the roots 12a of seedling 12. The method of the present invention therefore represents a much better utilization and conservation of water than does the method described in relation to FIGURES 1 and 2, and irrigation is therefore required much less frequently. Seedling crops may therefore be advantageously grown in arid climates where formerly such growing was not feasible due to the lack of an adequate irrigation water supply.

The plowing means for carrying out the method of the present invention is shown in FIGURES 5–8 respectively. The plow is generally designated as 18, and has a platform 19 from which walls 20, 21, 22, 23 and 24 extend upwardly at its edges. Opposed bolt hole sets 25 and 26 in walls 20 and 23, and bolt hole 27a in linkage 27, are provided as three-point attachment means for rigidly connecting the plow 18 to a tractor. The plow is then pulled in a direction such that walls 21 and 22 are the forward walls of the platform superstructure. Suspended from platform 19 are two spaced streamlined digging tools 28 and 29, and side smoothing fins 30 and 31 extend outwardly from side walls 20 and 23 of the plow platform superstructure. Channeling member 32 extends downwardly from the middle of the bottom surface of platform 19.

Streamlined digging tools 28 and 29 suspended from platform 19 are in the form of polyhedrons, having downwardly and forwardly extending leading edges 33 and 34 in the direction of plow travel. Digging tools 28 and 29 also have exposed plane surfaces 35, 36, 37, and 38, and 39, 40, 41 and 42, respectively. These plane surfaces in each digging tool respectively taper in their forward portions and terminate at points 43 and 44. When plow 18 is pulled by a tractor through a field, points 43 and 44 dig into the ground, and, as leading edges 33 and 34 enter the soil, a downward force is exerted on said edges of the digging tools because of their downward and forward inclination. This downward force, combined with the total weight of plow 18 which will generally weigh several hundred pounds and which may have additional weights placed upon the upper surface of platform 19, forces platform 19 and a portion of side walls 20, 21, 22, 23 and 24 below the soil level. Walls 21 and 22 converge forwardly in the direction of travel of the plow to form leading edge 45 of the platform superstructure, said edge 45 also serving as a digging instrument to the extent it is pulled below the unplowed ground surface. Plow 18 is pulled along by the tractor at a steady speed and platform 19 operates at a relatively fixed level below the original unplowed ground surface. This submerged orientation of platform 19 below the ground surface may be further insured by a rigid three point attachment from bolt holes 25, 26 and 27a to the tractor to constrain platform 19 from changing its vertical orientation with the ground surface as plowing is carried out. The extent that platform 19 is below the unplowed ground surface (and, accordingly the amount that side walls 20, 21, 22, 23 and 24 are submerged below said surface) is determined by several factors, including the angle that leading edges 33 and 34 extend forwarly during the operation of the plow which in turn determines the downward force exerted on digging tools 28 and 29 as they burrow through the ground, the total weight of plow 18, the speed that the plow 18 operates at, the surface configuration of the digging tools 28 and 29, and the constitution of the soil being worked.

Plow 18 forms the compressed subterranean seedling beds of FIGURES 3 and 4 as it is operated. Digging tools 28 and 29 form furrows 15, and in so doing, guide a portion of the soil dug from these furrows 15 along outwardly and upwardly extending outside plane surfaces 35 and 39 of said digging tools. This soil is thrown upwardly into the lower surfaces of side fins 30 and 31 which are bracketed to side walls 20 and 23 of the plow platform superstructure by struts 30a and 31a respectively. These fins then distribute this soil evenly and smoothly on top of the ground surface to contribute to ridges 14 as shown in FIGURE 3. Side fins 30 and 31 also serve to establish the maximum limit that the superstructure of platform 19 can submerge below the original unplowed ground surface, and therefore limit the depth of digging of the digging tools. Ridges 14 are also formed in part by soil channeled backwardly from leading edge 45 of converging side walls 21 and 22 of the platform superstructure as the lower portion of said leading edge is pulled through the soil. This soil channeled backwardly from the submerged portion of the side walls 21 and 22 is also evenly distributed and smoothed by fins 30 and 31 respectively.

Figure 6:
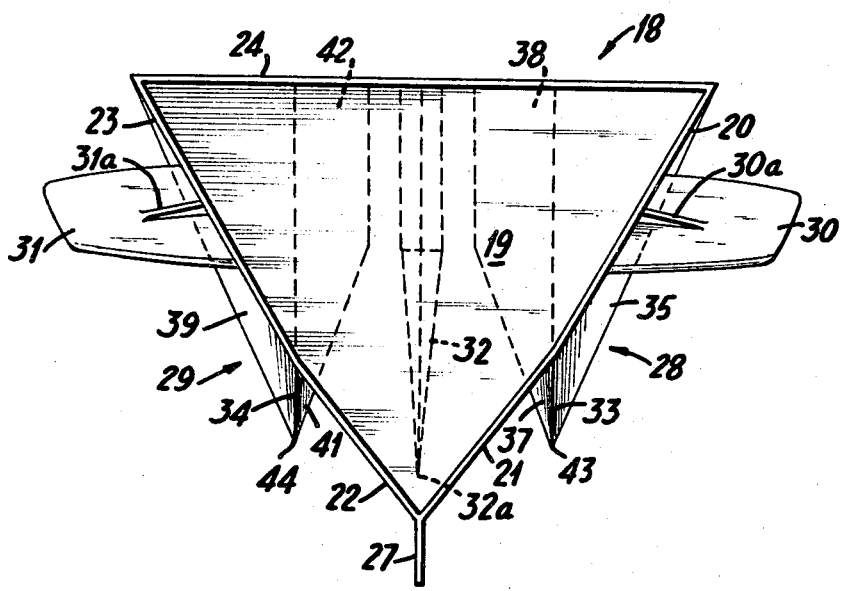
FIGURE 6 is a plan view of plowing means constructed according to the present invention.
Figure 7:
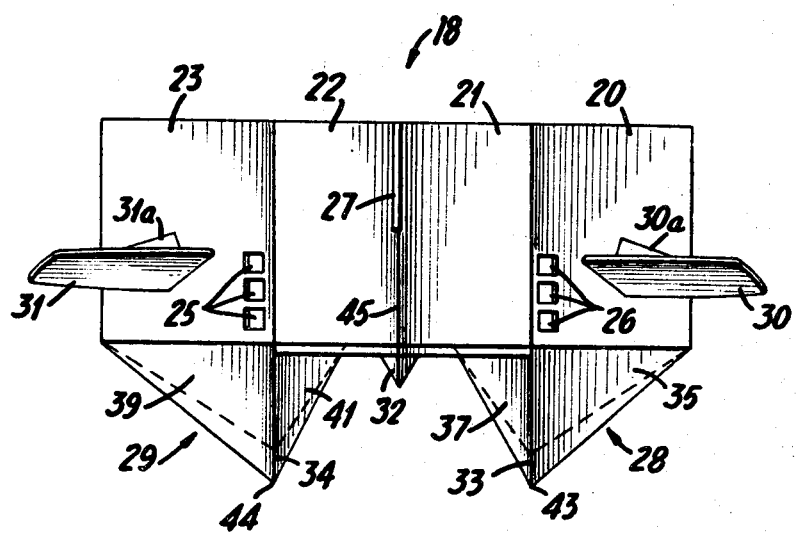
FIGURE 7 is a front elevation view of plowing means constructed according to the present invention.
Figure 8:
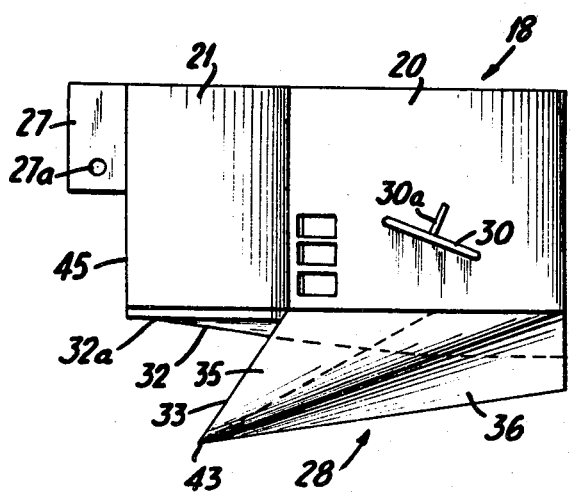
FIGURE 8 is a side elevation view of plowing means constructed according to the present invention.

Digging tools 28 and 29, in forming furrows 15, also guide a portion of the soil being dug into a convergent channel having an open forward end, an open rearward end, and defined by the bottom surface of platform 19, the inside plane surfaces 37, 38 and 41, 42 respectively of digging tools 28 and 29, and a soil plane parallel to the original unplowed soil surface and at the level of the deepest point of digging of digging tools 28 and 29. The cross-sectional area of said channel decreases in the rearward direction by virtue of surfaces of the channel converging toward one another, and, since platform 19 is oriented and constrained to operate at a relatively fixed level generally several inches below the original unplowed ground surface, said convergent channel operates as a restraining medium to compress and shape soil entering the front open end of the channel. Compressed ridge 16 is formed by said restraining channel, with top planting surface 16a of said ridge positioned below the original unplowed ground surface due to the orientation of the bottom surface of platform 19 below said ground surface. The convergence of the restraining channel is best illustrated in FIGURES 6 and 7, showing plane surfaces 37 and 41 of digging tools 28 and 29 extending rearwardly and inwardly toward each other from points 43 and 44 respectively until said surfaces meet inside plane surfaces 38 and 42 of digging tools 28 and 29. As plow 18 passes through the ground, the soil meeting the front end of the restraining channel, comprising the front end of the bottom surface of platform 19, the leading edges 33 and 34 of digging tools 28 and 29 and the soil plane parallel to the original unplowed soil surface and passing through the lower-most points of furrows 15, is funneled rearwardly into the channel. The volume of earth entering the forward end of the enclosure is compressed as plane surfaces 37 and 41 converge toward each other to narrow the cross-sectional area of the restraining channel, and, as the plow passes by, a compressed seedling bed 16 remains. The configuration and degree of compression of ridge 16 is determined by the configurations of the restraining channel. Planting furrow 17, in which the seedling 12 is ultimately planted, is cut in the subterranean compresssed seedling bed 16 by channeling member 32 attached to and suspended from the lower surface of platform 19. Channeling member 32 begins at point 32a at the forward end of platform 19, is triangular in cross-sectional area throughout, and increases in this cross-sectional area as it extends rearwardly.

The plow shown in the drawings and described above may assume different configurations and sizes while still remaining within the scope of the present invention. For example, the plow view (FIGURE 6) of platform 19 and the upwardly extending walls comprising its superstructure approximate a triangular configuration, but it will be appreciated that this shape may be varied as long as the upwardly extending walls assume a streamlined configuration converging to a leading edge 45 in the forward direction of the plow to serve as a digging instrument to the extent that said leading edge enters the ground.

Side digging tools 28 and 29 may also assume different polyhedral configurations with varying numbers of sides as long as the tools are reasonably streamlined and their forward surfaces converge to form leading edges 33 and 34 which extend downwardly and forwardly as the plow is operated. Side digging tools 28 and 29 may even have curved surfaces as long as the leading edge requirement is met, and the angle with platform 19 that the leading edges 33 and 34 assume will depend at least in part upon the depth of the seedling beds desired. Also, platform 19 need not be horizontal with the ground surface as the plow is operated, but may slope downwardly in the rearward direction. In such an instance, leading edges 33 and 34 may even be perpendicular to platform 19 since they will still be forwardly inclined as the plow is operated. If platform 19 does slope downwardly in a rearward direction during the operation of the plow, only the rearward portion of the platform 19 need by submerged below the original ground surface in order to produce compressed subterranean seedling beds 16. A downwardly sloping platform 19 will also aid in the compression of seedling bed 16, since such a platform orientation also causes the restraining channel defined above to decrease in cross-sectional area in the rearward direction. The attachment orientation of the plow to the tractor, and the configuration of the digging tools 28 and 29, determine the orientation of platform 19 with the ground surface.

In order that seedling bed 16 be formed in a compressed manner, surfaces of the restraining channel must converge in the forward to rearward direction over some portion of their length. FIGURES 6 and 7 show this convergence over the forward plane surfaces 37 and 41 of digging tools 28 and 29, but it will be appreciated that the convergence may occur gradually along the length of the inside surfaces of the digging tools 28 and 29, or may occur primarily at the rear of the inside surface of said digging tools.

Typical approximate dimensions of a plow constructed according to FIGURES 5–8 for the forming of subterranean compressed seedling beds may be plow weight of 600 pounds, a side wall 24 length of 1.1 meters, a side wall height of .4 meter, a front to back dimension of platform 19 from leading edge 45 of .8 meter, points 43 and 44 extending .25 meter below platform 19, side walls 20 and 23 having a length of .5 meter, and leading edges 33 and 34 extending downwardly and forwardly at an angle of 55° with platform 19. The plow may be easily constructed by forming the plow elements of cast iron or other suitable materials, and by welding these elements together.

It will be apparent to those of ordinary skill in the art to which this invention pertains that changes and modifications may be made from the means and method as described without departing from the spirit and scope of the invention.

I claim:

1. In a plow for forming subterranean compressed plant seedling beds, the combination of a platform, superstructure extending upwardly from said platform, digging means suspended from each side of said platform, means to force said digging means, at least a portion of said platform, and a portion of said platform superstructure a fixed distance below the unplowed ground level as the plow is operated, said means including surfaces of each said digging means converging in the direction of plow travel to terminate in a downwardly and forwardly extending leading edge as the plow is operated, means to guide a portion of the soil being dug to the sides of said plow to form a ridge on each side of the plow, and means to compress the soil which is channeled between said digging means as the plow is operated to form a compressed subterranean seedling bed.

2. In a plow for forming subterranean compressed plant seedling beds, the combination of a platform, superstructure extending upwardly from said platform and converging to a leading edge in the direction of plow travel, polyhedral digging means suspended from each side of said platform, means to force said digging means, said platform and a portion of said platform superstructure a fixed distance below the unplowed ground level as the plow is operated, said means including plane surfaces of each said polyhedral digging means converging in the direction of plow travel to terminate in a downwardly and forwardly extending leading edge, means to guide a portion of the soil being dug to the sides of said plow to form a ridge on each side of the plow, and means to compress the soil which is channeled between said digging means as the plow is operated to form a compressed subterranean seedling bed.

3. In a plow for forming subterranean compressed plant seedling beds, the combination of a platform, superstructure extending upwardly from said platform, digging means suspended from each side of said platform, means to guide a portion of the soil dug by said digging means to the sides of said plow to form a ridge on each side of the plow, channel means defined by the adjacent surfaces of said digging means, the under surface of said platform, and a plane parallel to the unplowed ground surface and situated at the lowest level of digging of said digging means, said channel means having a decreasing cross-sectional area in the rearward direction opposite to the direction of plow travel, and means constraining at least the rearward portion of said channel means at a fixed distance below the unplowed ground level as the plow is operated.

4. In a plow for forming subterranean compressed plant seedling beds, the combination of a platform, superstructure extending upwardly from said platform and converging to a leading edge in the direction of plow travel, polyhedral digging tools suspended from each side of said platform, the upper forward plane surfaces of each said polyhedral digging tool converging in the direction of plow travel to terminate in a downwardly and forwardly inclined leading edge, an outside surface of each digging tool extending toward the rear in an outward and upward direction to channel a portion of the soil being dug to the sides of said plow to form a ridge on each side of said plow, and an inside surface of each digging tool extending toward the rear in an inward direction to compress the soil passing, as the plow is operated, under said platform and between said digging tools.

5. In a plow for forming subterranean compressed plant seedling beds, the combination of a platform, superstructure extending upwardly from said platform and converging to a leading edge in the direction of plow travel, polyhedral digging tools suspended from each side of said platform, the upper forward plane surfaces of each said polyhedral digging tool converging in the direction of plow travel to terminate in a downwardly and forwardly inclined leading edge, an outside surface of each digging tool extending toward the rear in an outward and upward direction to channel a portion of the soil being plowed to the sides of said plow to form a ridge on each side of said plow, smoothing fins extending outward from opposite sides of said plow superstructure, an inside surface of each digging tool extending toward the rear in an inward direction to compress the soil passing, as the plow is operated, under said platform and between said digging tools, and a channeling member suspended from the under surface of said platform.

6. A method of contouring soil to form subterranean compressed plant seedling beds, including the steps of plowing two adjacent furrows in the soil while retaining an intervening ridge between said furrows, funneling a portion of the soil from each furrow to the non-adjacent outer sides of the two furrows to form ridges adjacent said furrows above the original soil surface, lowering the soil surface of said intervening ridge to a level below the unplowed ground level but above the level of the bottom of the furrows, compressing the remaining soil from each furrow into the intervening ridge between each furrow to form a compressed subterranean plant seedling bed, and forming a channel in the top of said seedling bed.

References Cited
UNITED STATES PATENTS

| | | | |
|---|---|---|---|
| 375,081 | 12/1887 | Lynch | 111—83 |
| 537,875 | 4/1895 | Wheeler. | |
| 2,673,511 | 3/1954 | Roberts | 172—722 |
| 3,023,717 | 3/1962 | Cline | 172—701 X |
| 1,247,744 | 11/1917 | Trimble | 111—81 |
| 1,371,012 | 3/1921 | Williams | 111—14 |

ABRAHAM G. STONE, *Primary Examiner.*

WILLIAM A. SMITH III, *Examiner.*

J. R. OAKS, *Assistant Examiner.*